United States Patent
Suzuki et al.

(10) Patent No.: US 10,421,167 B2
(45) Date of Patent: Sep. 24, 2019

(54) MOVABLE STAND WITH CASTERS AND PROCESSING MACHINE LINE

(71) Applicant: FUJI MACHINE MFG. CO., LTD., Chiryu-shi (JP)

(72) Inventors: Toshifumi Suzuki, Toyota (JP); Jun Yanagisaki, Toyota (JP); Shigefumi Suzuyama, Toyota (JP)

(73) Assignee: FUJI CORPORATION, Chiryu-shi (JP)

( * ) Notice: Subject to any disclaimer, the term of this patent is extended or adjusted under 35 U.S.C. 154(b) by 0 days.

(21) Appl. No.: 15/560,283

(22) PCT Filed: Mar. 26, 2015

(86) PCT No.: PCT/JP2015/059340
§ 371 (c)(1),
(2) Date: Sep. 21, 2017

(87) PCT Pub. No.: WO2016/151835
PCT Pub. Date: Sep. 29, 2016

(65) Prior Publication Data
US 2018/0071873 A1    Mar. 15, 2018

(51) Int. Cl.
| | | |
|---|---|---|
| B23Q 1/40 | (2006.01) | |
| B23Q 41/04 | (2006.01) | |
| B60B 33/00 | (2006.01) | |
| B25H 1/00 | (2006.01) | |
| B25H 1/04 | (2006.01) | |

(Continued)

(52) U.S. Cl.
CPC ............ *B23Q 1/40* (2013.01); *B23Q 1/0045* (2013.01); *B23Q 37/007* (2013.01); *B23Q 41/04* (2013.01); *B25H 1/0042* (2013.01); *B25H 1/04* (2013.01); *B60B 33/00* (2013.01); *A47B 91/06* (2013.01); *A47F 5/137* (2013.01)

(58) Field of Classification Search
USPC .......... 280/2, 47.34, 47.35, 79.11, 47.11, 98; 248/129
See application file for complete search history.

(56) References Cited

U.S. PATENT DOCUMENTS

| | | | |
|---|---|---|---|
| 5,839,721 A | 11/1998 | Kobayashi | |
| 7,377,525 B1 * | 5/2008 | Whitmore | B25H 1/04 280/39 |

(Continued)

FOREIGN PATENT DOCUMENTS

| | | |
|---|---|---|
| JP | 2004-113810 A | 4/2004 |
| JP | 2015-034573 A | 2/2015 |
| JP | 2015-034574 A | 2/2015 |

*Primary Examiner* — Alfred J Wujciak
(74) *Attorney, Agent, or Firm* — Oblon, McClelland, Maier & Neustadt, L.L.P.

(57) ABSTRACT

A movable stand with casters for installing each of a plurality of separate type control panels that correspond to a plurality of machine tools disposed in parallel and are disposed to be separated from the machine tools, is provide. The stand includes a top plate sections on which the separate type control panel is installed, a plurality of leg sections that support the top plate section, and horizontal sections that are provided to attach the casters to bottom sections of the leg sections and are horizontal to a floor, in which, out of the horizontal sections, a height from the floor of one horizontal section is different from a height from the floor of another horizontal section.

8 Claims, 8 Drawing Sheets

(51) Int. Cl.
  B23Q 37/00  (2006.01)
  B23Q 1/00  (2006.01)
  *A47F 5/13*  (2006.01)
  *A47B 91/06*  (2006.01)

(56) References Cited

U.S. PATENT DOCUMENTS

| | | | |
|---|---|---|---|
| 7,490,847 B2 * | 2/2009 | Dahl | B60B 3/001 |
| | | | 211/153 |
| 8,087,679 B1 * | 1/2012 | Salvucci, Jr. | B62B 3/04 |
| | | | 280/47.18 |
| 2007/0114739 A1 * | 5/2007 | Simmons | B62B 1/264 |
| | | | 280/47.27 |

* cited by examiner

FIG. 8

MOVABLE STAND WITH CASTERS AND PROCESSING MACHINE LINE

TECHNICAL FIELD

The present disclosure relates to a movable stand with casters on which a separate type control panel that is disposed separately from a machine tool is installed to be movable, and in particular, relates to a movable stand with casters that is able to move avoiding interference with other separate type control panels that are disposed close to a neighbor and a processing machine line in which the separate type control panel is installed on the movable stand with casters.

BACKGROUND ART

In the processing machine line in which multiple machine tools are closely disposed to each other, since improved workability of maintenance and the like is achieved, a control panel that is positioned to the rear may be separated from the machine tools, and may be disposed in a movable state. In such a processing machine line, the control panel is installed on a movable stand with casters, and a configuration is adopted in which it is possible to freely move while being connected to the machine tool side with a wiring. Then, in the movable stand with casters, in a case where work is carried out in a rear section with respect to the machine tool, it is possible for an operator to easily transfer the control panel that is a heavy load, and it is possible to secure a work space.

CITATION LIST

Patent Literature

PTL 1: JP-A-2004-113810

SUMMARY

However, on a processing machine line in which multiple machine tools are closely disposed to each other in the width direction, adjacent control panels are closely disposed to each other in the same manner as the machine tools. Accordingly, in a case where the control panel is moved, the control panel is moved straight to the rear along the front-rear direction of the machine tool. At that time, it is preferable if there is sufficient space to the rear of the processing machine line, but it may not be possible to sufficiently secure a rear side space using an installed location. At such an installation location, even if there is a control panel that is movable with difficulty, it is not possible to move slightly to the rear of the machine tools, and the effect of the separate type control panel with the object of securing the work space is impaired.

Therefore, in order to solve the problem, the present disclosure has an object of providing a movable stand with casters that is movable in a small space and a processing machine line.

A movable stand with casters according to an aspect of the present disclosure is a movable stand with casters for installing each of a plurality of separate type control panels that correspond to a plurality of machine tools disposed in parallel and are disposed to be separated from the machine tools, and the movable stand with casters includes a top plate section on which the separate type control panel is installed, a plurality of leg sections that support the top plate section, and horizontal sections that are provided to attach the casters to bottom sections of the leg sections and are horizontal to a floor, in which, out of the horizontal sections, a height from the floor of one horizontal section is different from a height from the floor of another horizontal section.

A processing machine line according to another aspect of the disclosure is a processing machine line in which a plurality of machine tools, which are configured with a base and a processing module that is installed to be movable in a front-rear direction along a straight line rail provided on the base separately with a gap in a width direction, are disposed in parallel, and a plurality of movable separate type control panels that are installed on movable stands with casters are separately disposed to the rear of the machine tools, in which each of the movable stands with casters includes a top plate section on which the separate type control panel is installed, a plurality of leg sections that support the top plate section, and horizontal sections that are provided to attach the casters to bottom sections of the leg sections and are horizontal to a floor, and in which, out of the horizontal sections, a height from the floor of one horizontal section is different from a height from the floor of the another horizontal section.

According to the present disclosure, it is possible to move the separate type control panels that are separated from the machine tools configuring the processing machine line, in particular, since the height from the floor of one horizontal section is different from the height from the floor of the other horizontal section, it is possible to move to slightly turn such that the horizontal section at a high position in the movable stand with casters at a movement side avoids interference with the horizontal section at a low position in another movable stand with casters that is positioned adjacently. Consequently, in a case where a certain separate type control panel is moved, it is possible to move in a small space since movement to greatly turn such that there is separation from the movable stand with casters of the separate type control panel that is positioned adjacently may not be caused.

DESCRIPTION OF EMBODIMENTS

Figure 1:
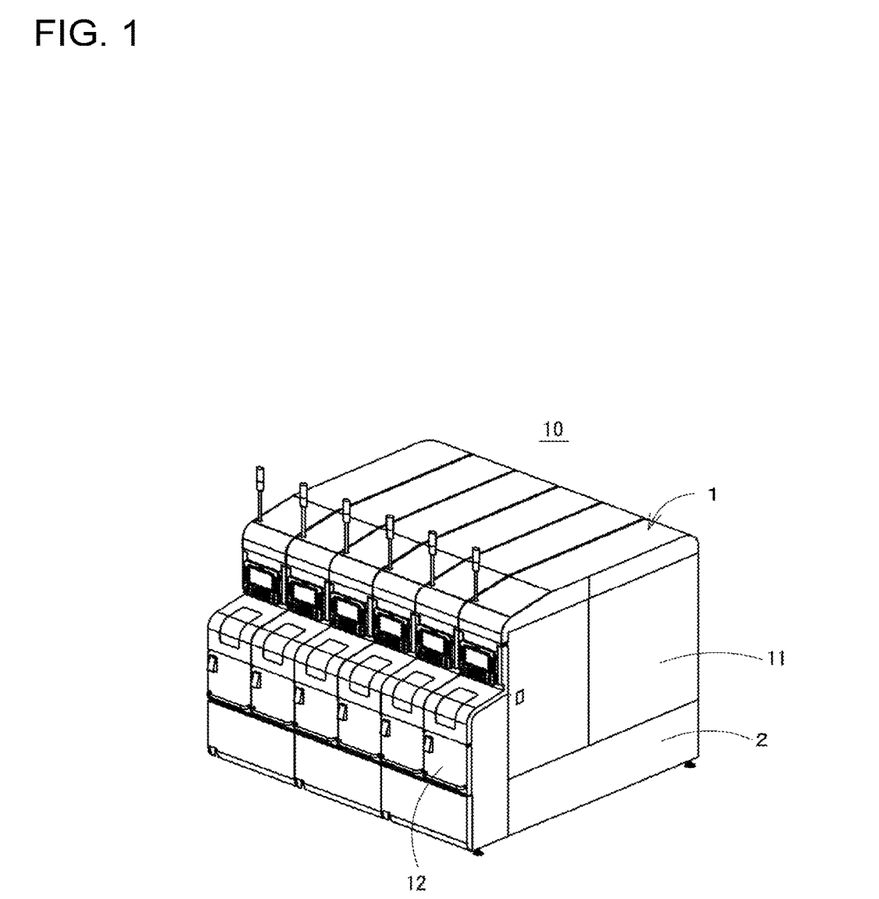
FIG. 1 is a perspective view illustrating one embodiment of a processing machine line.

Next, one embodiment of a movable stand with casters and a processing machine line according to the present disclosure will be described below with reference to the drawings. FIG. 1 is a perspective view illustrating the processing machine line of the present embodiment. In a processing machine line 10, six machine tools 1 that are installed on a base 2 are lined up. Each of the six machine tools 1 is an NC lathe of the same shape, and the internal structure, and entire form and dimensions are the same. In particular, the machine tool 1 is a compact machine body designed to have a small width dimension, and the entirety of the processing machine line 10 in which the machine tools 1 are closely disposed to each other is gathered to be compact.

Figure 2:
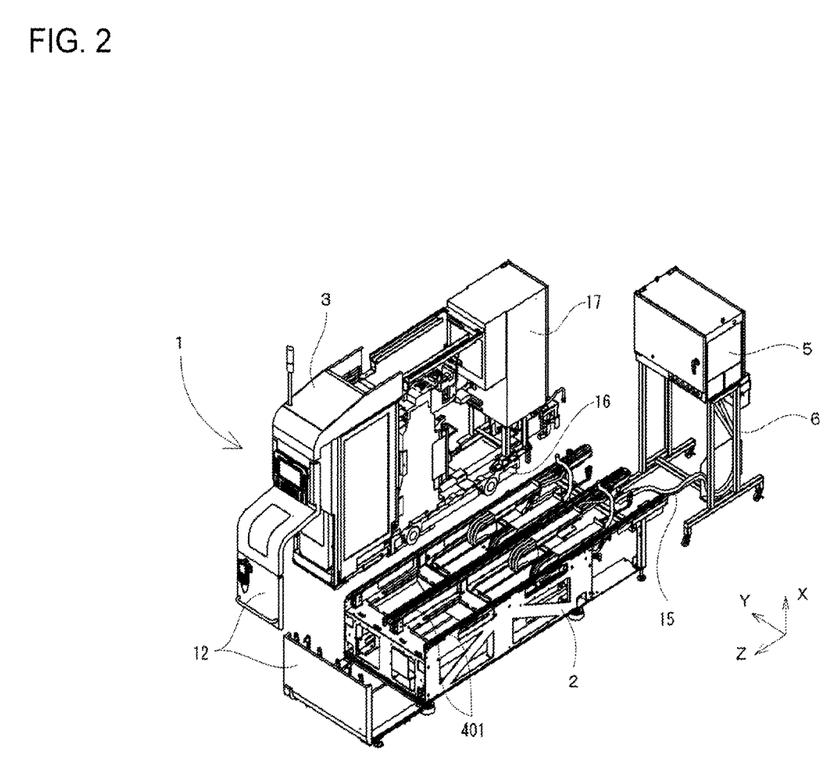
FIG. 2 is a perspective view illustrating a state in which each configuration of machine tools is separated.

The machine tools 1 are all covered by an exterior cover 11, and a processing module that is constituted by a machine tool main body is internally provided. FIG. 2 is a perspective view illustrating a state in which each configuration of the processing machine line 10 is separated, and indicates a base 2, a processing module 3, and a control panel 5 that is omitted from FIG. 1. The processing module 3 indicates a state in which the exterior cover 11 is removed, and furthermore, theoretically, only one of the two processing modules 3 is installable on the base 2. Since two processing modules 3 correspond to one base 2, in the processing machine line 10 that is illustrated in FIG. 1, three bases 2 are lined up and six processing modules 3 are installed on the bases.

Then, the processing modules 3 are configured on a movable bed 16 that is provided with wheels so that it is possible to move on the base 2 in the front-rear direction along straight line rails 401 provided separated with a gap in a width direction. A turret device that is provided with a main spindle stand or a tool that grasps a workpiece, a driving device that moves the turret device in the Z-axis and X-axis directions, a control device 17, and the like are installed on the movable bed 16. Consequently, in the machine tool 1, a tool is selected by revolving and indexing the turret device, positioning of the tool is carried out by driving an X-axis driving device and a Z-axis driving device, and cutting processing and the like are carried out on the workpiece that is rotated by driving of the main spindle.

In addition, the machine tool 1 is provided with a workpiece conveyance device. The workpiece conveyance device carries out delivery of the workpiece to and from each of the processing modules 3, and is disposed inside a front cover 12 that is formed in front of the machine tool 1. A plurality of the front covers 12 constitute one cavity that is continuous in the width direction, and the workpiece conveyance device that is provided with a robot arm in the space is attached to the base 2 to be able to run. In the processing machine line 10 illustrated in FIG. 1, an internal conveyance space is formed, therein the workpiece conveyance device moves, and delivery of the workpiece to and from each of the machine tools is carried out.

Furthermore, in the present embodiment, the control panel 5 is provided at a separate position from the machine tool 1. In particular, the control panel 5 is installed on the movable stand with casters 6 so as to be movable. Then, the control panel 5 is disposed to the rear of the machine tool 1 and connected to the processing module 3 side by a wiring 15. For example, the wiring 15 is a power cable for driving a servomotor for the main spindle and a servomotor for the X-axis and Z-axis driving devices, a communication cable that exchanges a signal for carrying out driving control, and the like.

Figure 3:
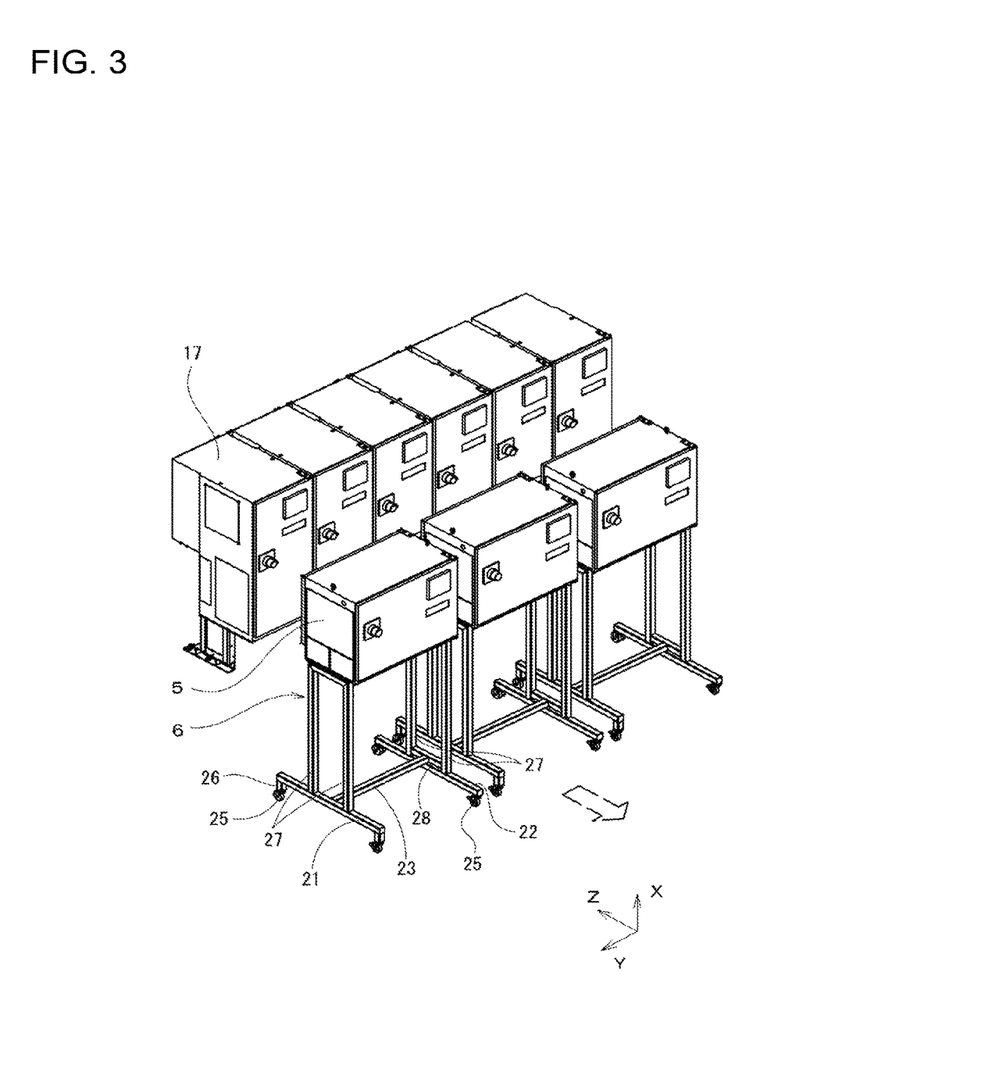
FIG. 3 is a perspective view illustrating control panels lined up at the rear of the processing machine line.

The control panels 5 on the processing machine line 10 are provided on each base 2, that is, with respect to two machine tools 1. Accordingly, as illustrated in FIG. 3, three control panels 5 are provided on the base 2 in three processing machine lines 10. FIG. 3 is a perspective view illustrating control panels 5 lined up at the rear of the processing machine line 10. A control device 17 of each of the processing modules 3 is indicated so as to be divided by a relationship with the machine tool 1. As exemplified, the processing modules 3 (control devices 17) are disposed to approach each other, and in the same manner, three control panels 5 are disposed to approach each other.

Accordingly, during maintenance and the like, in a case where the control panels 5 are separated from the machine tools 1 and caused to move, normally, the control panels 5 are caused to move to the rear side as indicated by an arrow. However, as will be described, even in the problem, sufficient space is necessary to the rear of the processing machine line 10. Note that, in the related art, there are multiple folding tables with casters and the like that is indicated in PTL 1 having the same configuration as the movable stand with casters 6. The object of providing casters is to move to a storage location, and the folded table is stored in the storage location to be compact. That is, in the related art, the structure that is provided with the casters is simply for movement.

In this point, since improvement of workability is achieved even in the present embodiment, movement of the control panels 5 becomes the object. However, in the structure that is simply for movement, it is not possible to sufficiently exhibit the effect of a small space in which a movement range is limited. Therefore, in the present embodiment, interference of the movable stand with casters 6 with each other is avoided, and the movable stand with casters 6 is suggested that is movable to slightly turn. Note that, the movable stands with casters 6 are hereinafter simply referred to as movable stands 6.

Figure 4:
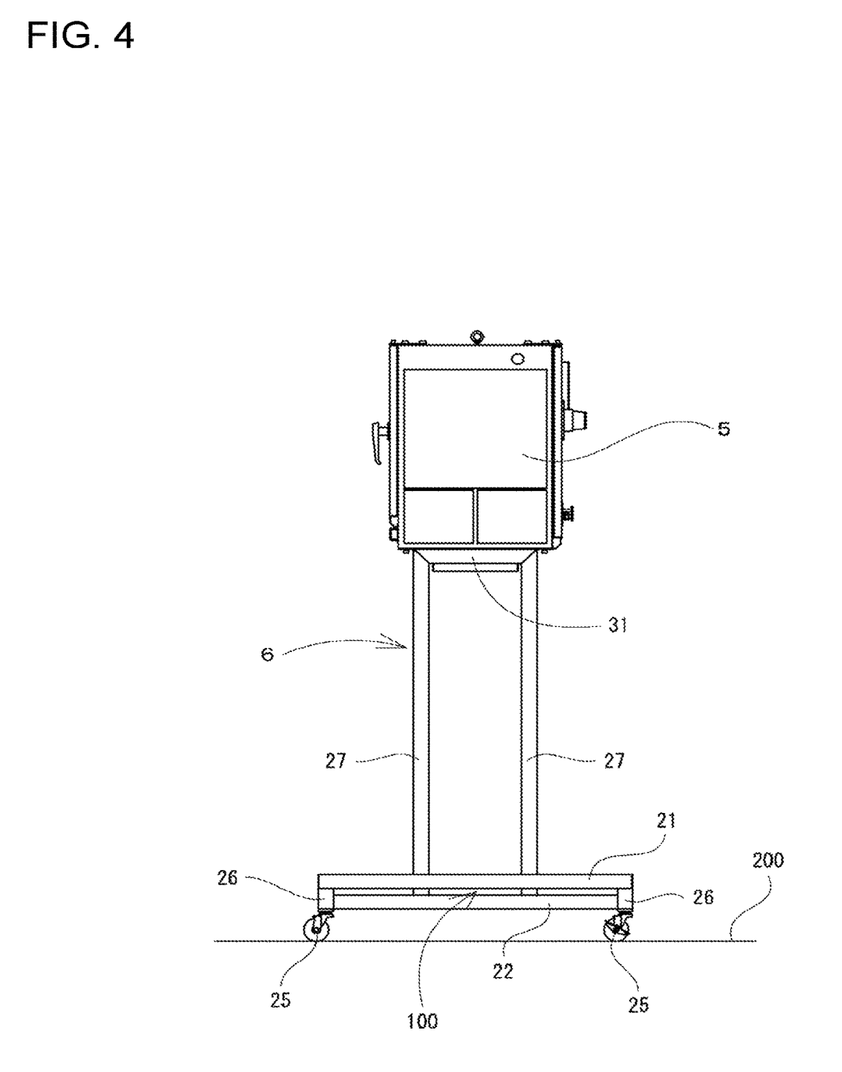
FIG. 4 is a side view illustrating a movable stand in a state in which the control panel is installed.
Figure 5:
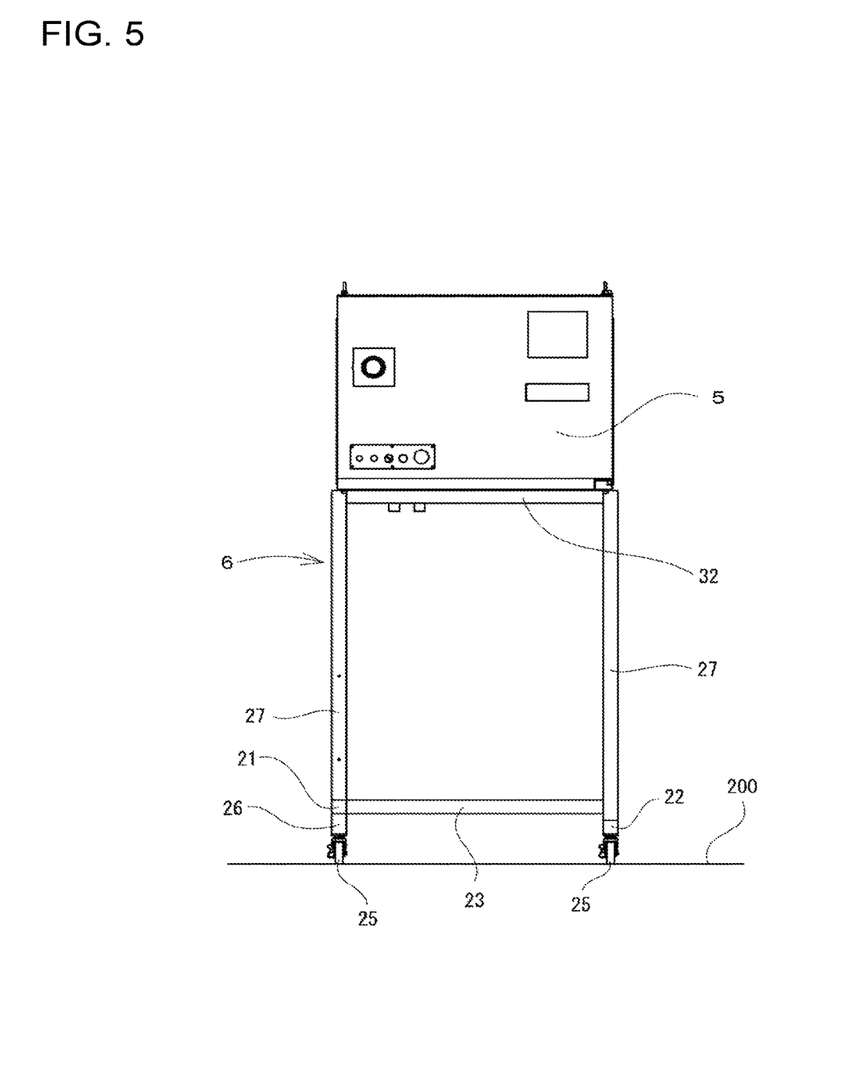
FIG. 5 is a front view illustrating the movable stand in a state in which the control panel is installed.
Figure 6:
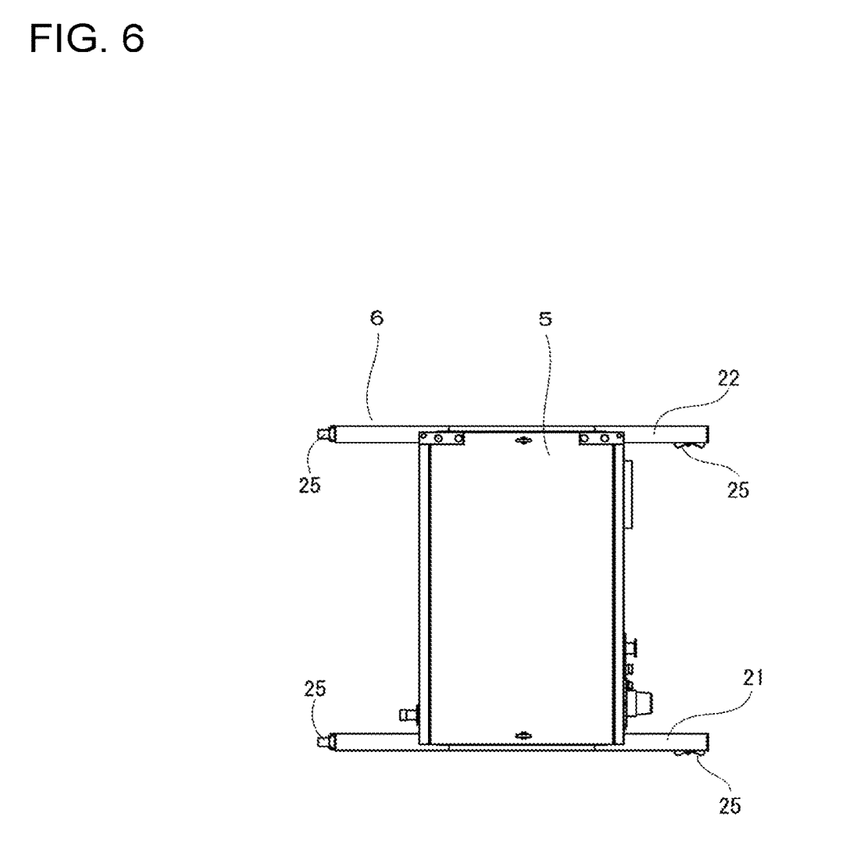
FIG. 6 is a planar view illustrating the movable stand in a state in which the control panel is installed.

In this arrangement, FIG. 4 to FIG. 6 are diagrams that indicate the movable stand 6 in a state in which the control panel 5 is installed, FIG. 4 is a side view, FIG. 5 is a front view in the front-rear direction, and FIG. 6 is a planar view. Note that, in the present embodiment, the machine tool 1 is referred to, a Z-axis direction that is indicated in FIG. 2 and FIG. 3 is described as the front-rear direction, the Y-axis direction is described as the width direction, and the X-axis direction is described as the height direction. The direction that indicates the description of the movable stand 6 and the conveyance jig 8 designates a direction in a state that is indicated in FIG. 2 and FIG. 3 of being disposed with respect to the machine tools 1 (processing machine line 10).

The movable stand 6 is assembled in a predetermined shape in which multiple members configured with a rectangular steel pipe are joined to each other. Therefore, first, in the movable stand 6, the horizontal members 21 and 22 are disposed horizontal to a floor 200 that extends in the front-rear direction. Casters 25 are attached at both end sections to the front and rear of the horizontal members 21 and 22, and movement is possible in a state in which the control panel 5 is supported by a total of four casters 25. The horizontal members 21 and 22 are configured to be disposed in the width direction with a gap that matches the width dimension of the control panels 5, the length of the front-rear direction is longer than the dimensions of the control panels 5, and the casters 25 are positioned at positions that protrude to the front and rear in planar view. Consequently, the control panels 5 are disposed at a high position, but stabilized movement is possible by the casters 25 at four locations in both end sections of the horizontal members 21 and 22.

Then, an auxiliary member 26 is joined to one horizontal member 21 so as to protrude downward with respect to both end sections, and the casters 25 are attached thereto. Accordingly, as illustrated in FIG. 4, the horizontal member 21 is disposed at a higher position from the floor 200 than the other horizontal member 22, and a height difference between both in the up-down direction is set such that there is a slight gap 100 in a case of viewing from the side. The movable stands 6 that are used by the processing machine line 10 are all the same, and in the case of disposing as indicated in FIG. 3, the positions of all movable stands 6 are aligned to the left and right of the horizontal members 21 and 22.

Next, the horizontal members 21 and 22 are orthogonally joined to two leg members 27 respectively to the front and rear. The gap in the front-rear direction respectively of the two leg members 27 of the horizontal members 21 and 22 corresponds to the dimensions of the control panels 5. The length of the leg members 27 is set such that the height of the control panels 5 that are installed on the movable stands 6 are positioned for easy handling by the operator. Then, upper end portions of the standing four leg members 27 are connected at four sides by the beam members 31 and 32, and are configured by the top plate sections such that it is possible to install in a state in which the control panel 5 is fixed.

Furthermore, the movable stands 6 are connected to both the left and right sides by a reinforcing member 23 at a lower part. The movable stands 6 are configured such that twisting of the leg members 27 that occurs during movement is suppressed by the reinforcing member 23 since the center of gravity is at a position of the casters 25, that is, a high position from the floor 200 due to the installed control panels 5. At that time, the reinforcing member 23 is joined horizontally. Therefore, a connecting member 28 that is at the same height as the horizontal member 21 is joined to the two leg members 27 that are joined to the horizontal member 22 side. Then, the reinforcing member 23 is joined to the horizontal member 21 at one end, and is joined to the connecting member 28 at the other end.

Figure 7:
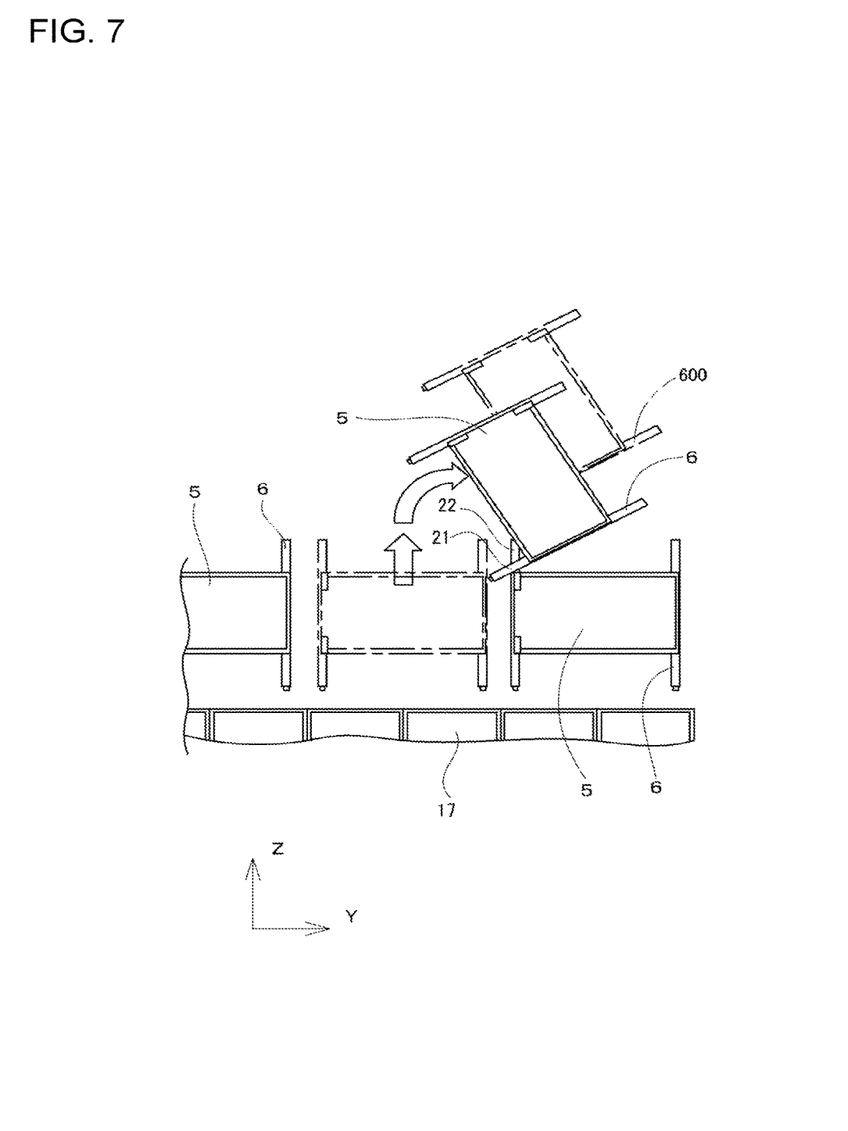
FIG. 7 is a planar view illustrating a simplification of movement of the control panel by the movable stand.

Subsequently, as illustrated in FIG. 3, in the processing machine line 10 of the present embodiment, the control panels 5 are installed on the movable stands 6, and are disposed to the rear of the machine tools 1 (control devices 17). At this time, three control panels 5 and movable stands 6 are not only disposed closely to each other, but also at positions close to the machine tools 1. Accordingly, as described above, in a case where work such as maintenance is carried out by the operator at the rear of the machine tools 1, it is necessary to move the control panels 5 to secure a work space. In this arrangement, FIG. 7 is a planar view illustrating a simplification of movement of the control panels 5 by the movable stands 6 of the present embodiment. In particular, a case where the control panel 5 that is positioned in the center interposed to the left and right is moved is illustrated in comparison to a related art example.

In a case where the control panel 5 is moved, the control panel 5 rotates to either one of the left or right (right side in FIG. 7) after being moved straight to the rear (upward in FIG. 7) as indicated by an arrow. The control panel 5 is rotated in order to be able to more widely secure a rear side space of the machine tool 1 that is the target. In addition, therefore it is possible to suppress the length of the wiring 15 by shortening the straight line distance from the processing module 3. Furthermore, therefore it is possible to set such that there is no hindrance to work by bringing the wiring 15 close to the rotation side. In particular, regarding the third point, the control panel 5 in the present embodiment determines that the rotation direction is to the right side since the wiring 15 comes out from the right side and extends to the processing module 3. Then, the movable stand 6 is designed such that the disposition of the horizontal members 21 and 22 matches the rotation direction. That is, the horizontal member 21 at the high position is designed so as to be positioned on the inside during rotation.

Figure 8:
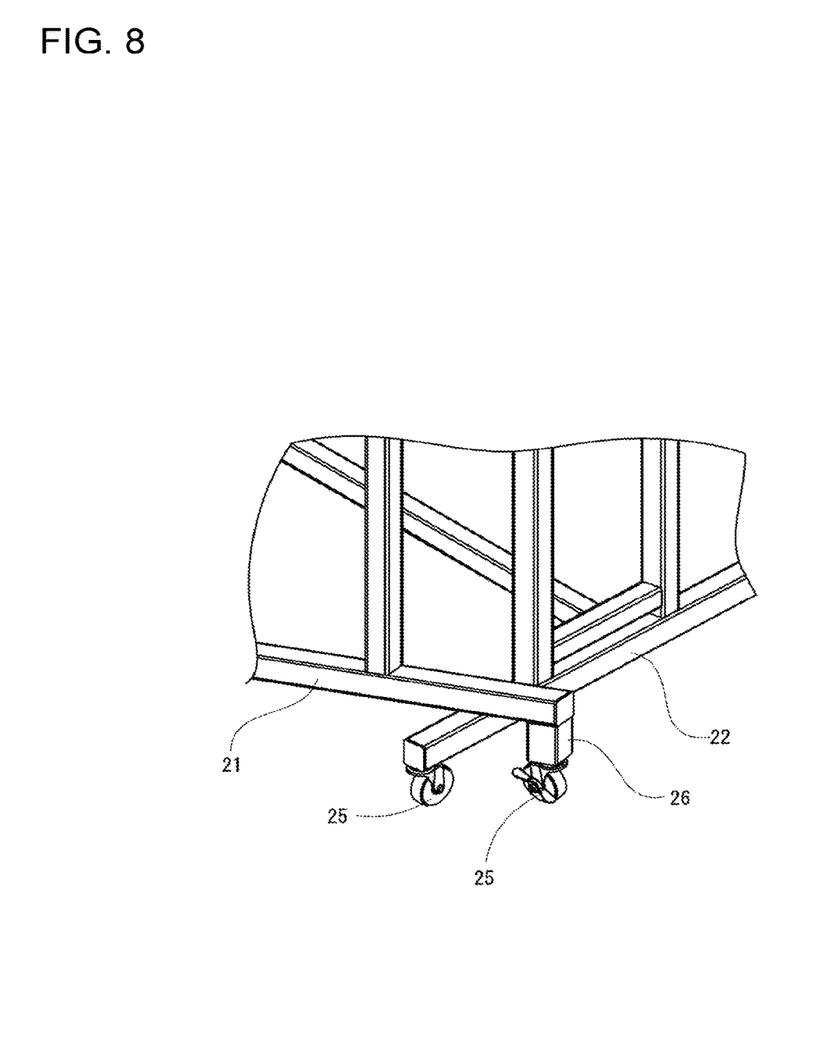
FIG. 8 is a partial perspective view illustrating a relationship between the movable stands.

Therefore, first, a movable stand 600 of the related art that is indicated by a dashed line has to be moved to a distant position as exemplified. Meanwhile, as indicated by a solid line, the movable stand 6 of the present embodiment is able to be moved to a closer position. Movement at this time is movement straight to the rear up to a position that does not overlap with the control panel 5 that is stationary next to the center control panel 5 viewed in the width direction (Y-axis direction), then next, rotated to the left side as indicated by an arrow. In the rotation step, each of the movable stands 6 that are adjacent to each other viewed in the width direction overlap with the horizontal members 21 and 22. However, in the present embodiment, since the horizontal member 21 at the rotation inner side is at a higher position than the horizontal member 22 of the movable stand 6 that is positioned adjacent by the gap 100, as illustrated in FIG. 8, it is possible to intersect the horizontal member 21 on the horizontal member 22.

In this point, the movable stand 600 of the related art has generally the same configuration as described in PTL 1, and the heights of each of the left and right horizontal members that are provided with the casters are the same. Therefore, if the movable stand 600 does not retreat to a position so as not to overlap with the adjacent movable stand 600 viewed in the width direction, the movable stand 600 is not able to rotate, therefore the movable stand 600 comes away from the machine tool 1 up to the position that is indicated in FIG. 7. Consequently, a movement space is necessary at the rear of the processing machine line 10 by that amount.

In contrast, according to the movable stand 6 of the present embodiment, a space to the rear of the processing machine line 10 may be small since each of the adjacent control panels 5 as described above may be caused to retreat to a deviated position viewed from the width direction (Y-axis direction) and rotated. Then, since the control panel 5 rotates and moves, the rear side space is released close to the machine tool 1, and improvement of workability of maintenance and the like is maintained by the operator. In addition, it is possible to shorten the length of the wiring 15 more than in the related art since the movement position of the control panel 5 from the machine tool 1 is close. Furthermore, the movable stand 6 is a low-cost one in which the members configured with a rectangular steel pipe are joined and moreover the effect is obtained by a simple configuration in which the height of the horizontal member 21 is increased by the auxiliary member 26.

An embodiment of the present disclosure is described above, but the present disclosure is not limited thereto, and various modifications are possible within a range which does not depart from the gist of the present disclosure. For example, the members that constitute the movable stand 6 may not be the rectangular steel pipe and may be around steel pipe or another member. In addition, the leg member and the like may not be a steel pipe and may be a plate member.

REFERENCE SIGNS LIST

1: machine tool, 2: base, 3: processing module, 5: control panel, 6: movable stand with casters, 10: processing machine line, 15: wiring, 17: control device, 21, 22: horizontal member, 23: reinforcing member, 25: caster, 26: auxiliary member, 27: leg member, 28: connecting member, 31, 32: beam member

The invention claimed is:

1. A movable stand with casters for installing each of a plurality of separate type control panels that correspond to a plurality of machine tools disposed in parallel and are disposed to be separated from the machine tools, the movable stand with casters comprising:
- a top plate section on which the separate type control panel is installed;
- a first leg section and a second leg section that support the top plate section, the first leg section being disposed on a first lateral side of the top plate section, and the second leg section being disposed on a second lateral side of the top plate section, the first lateral side and the second lateral side being opposite each other; and
- a first horizontal section joined to the first leg section, and a second horizontal section joined to the second leg section, each of the first and second horizontal sections extending in a front-rear direction and being horizontal to a floor,
- wherein a first caster is provided at a first end of the first horizontal section, a second caster is provided at a second end of the first horizontal section, a third caster is provided at a first end of the second horizontal section, and a fourth caster is provided at a second end of the second horizontal section,
- wherein a vertical distance between the floor and a lower surface of the first horizontal section is greater than a vertical distance between the floor and an upper surface of the second horizontal section such that a height from the floor of the first horizontal section is greater than a height from the floor of the second horizontal section.

2. The movable stand with casters according to claim 1, wherein the first and second horizontal sections include rod members, and the rod members have a longer dimension than the separate type control panel that is installed on the top plate section in the front-rear direction, and wherein the first and second leg sections include rod members or plate members respectively erected on the rod members of the first and second horizontal sections.

3. The movable stand with casters according to claim 2, wherein in the first horizontal section, the first and second casters are each respectively attached to the first and second ends of the first horizontal section via an auxiliary member.

4. The movable stand with casters according to claim 2, wherein the first and second horizontal sections and the first and second leg sections include a steel pipe.

5. The movable stand with casters according to claim 1, wherein in the first horizontal section, the first and second casters are each respectively attached to the first and second ends of the first horizontal section via an auxiliary member.

6. The movable stand with casters according to claim 5, wherein the first and second horizontal sections and the first and second leg sections include a steel pipe.

7. The movable stand with casters according to claim 1, wherein the first and second horizontal sections and the first and second leg sections include a steel pipe.

8. The movable stand with casters according to claim 1, further comprising:
- a reinforcing member at a lower portion of the movable stand; and
- a connecting member at a same height of the first horizontal section, the connecting member being connected to the second leg portion,
- wherein a first end of the reinforcing member is connected to the first horizontal section and a second end of the reinforcing member is connected to the connecting member.

* * * * *

UNITED STATES PATENT AND TRADEMARK OFFICE
CERTIFICATE OF CORRECTION

| | | |
|---|---|---|
| PATENT NO. | : 10,421,167 B2 | Page 1 of 1 |
| APPLICATION NO. | : 15/560283 | |
| DATED | : September 24, 2019 | |
| INVENTOR(S) | : Toshifumi Suzuki et al. | |

It is certified that error appears in the above-identified patent and that said Letters Patent is hereby corrected as shown below:

On the Title Page

Item (71), should read:
-- (71) Applicant: FUJI CORPORATION, Chiryu-shi (JP) --

Signed and Sealed this
Eighth Day of December, 2020

Andrei Iancu
*Director of the United States Patent and Trademark Office*